(12) United States Patent
Bao et al.

(10) Patent No.: US 8,045,612 B1
(45) Date of Patent: Oct. 25, 2011

(54) FAST INVERSE INTEGER TRANSFORM FOR VIDEO DECODING

(75) Inventors: Jia Bao, Shanghai (CN); Zi Gu, Shanghai (CN)

(73) Assignee: Marvell International Ltd., Hamilton (BM)

( * ) Notice: Subject to any disclaimer, the term of this patent is extended or adjusted under 35 U.S.C. 154(b) by 961 days.

(21) Appl. No.: 11/970,965

(22) Filed: Jan. 8, 2008

Related U.S. Application Data (60) Provisional application No. 60/885,746, filed on Jan. 19, 2007.

(51) Int. Cl.
*H04N 7/12* (2006.01)
(52) U.S. Cl. .............................. 375/240.01; 375/240.18
(58) Field of Classification Search ............. 375/240.01, 375/240.16, 240.18, 240.33
See application file for complete search history.

(56) References Cited

U.S. PATENT DOCUMENTS

| | | | |
|---|---|---|---|
| 2006/0126734 A1* | 6/2006 | Wiegand et al. | 375/240.12 |
| 2006/0133644 A1* | 6/2006 | Wells et al. | 382/100 |
| 2007/0058720 A1* | 3/2007 | Park et al. | 375/240.12 |
| 2008/0284906 A1* | 11/2008 | Cham et al. | 348/441 |
| 2008/0310507 A1* | 12/2008 | Ye et al. | 375/240.12 |
| 2009/0003447 A1* | 1/2009 | Christoffersen et al. | 375/240.16 |
| 2009/0003476 A1* | 1/2009 | Rog et al. | 375/260 |
| 2009/0196352 A1* | 8/2009 | Stein et al. | 375/240.15 |
| 2010/0086028 A1* | 4/2010 | Tanizawa et al. | 375/240.12 |
| 2010/0316119 A1* | 12/2010 | Mathew et al. | 375/240.03 |
| 2011/0002554 A1* | 1/2011 | Uslubas et al. | 382/238 |
| 2011/0038556 A1* | 2/2011 | Mathe | 375/240.03 |

* cited by examiner

*Primary Examiner* — Andrew Lee (57) ABSTRACT

In video decoding using the H.264/AVC standard, the computation of an inverse 4×4 integer transform of a coefficient matrix derived by variable length decoding may be carried out using data reduction techniques to reduce the computation load. If the index value of the highest-indexed nonzero coefficient in the matrix is three or higher, the transform is computed conventionally, using two 1D transform operations separated by a transpose operation, and followed by rounding and shifting. If the index value of the highest-indexed nonzero coefficient in the matrix is zero (including the case where there is no nonzero coefficient), the inverse integer transform operation includes only rounding and shifting of that coefficient. If the index value of the highest-indexed nonzero coefficient in the matrix is one or two, then the inverse integer transform operation can be performed using a single integrated 2D transform followed by rounding and shifting.

35 Claims, 7 Drawing Sheets

FAST INVERSE INTEGER TRANSFORM FOR VIDEO DECODING

CROSS REFERENCE TO RELATED APPLICATION

This claims the benefit of U.S. Provisional Patent Application No. 60/885,746, filed Jan. 19, 2007, which is hereby incorporated by reference herein in its entirety.

BACKGROUND

This disclosure relates to the calculation of an inverse integer transform in video decoding, and more particularly to a way to reduce the computational resources required for that calculation in at least some situations.

Under the video decoding standard known as H.264/AVC, calculation of inverse integer transforms is required at some point in the decoding process. This calculation is computation-intensive, and can consume between about 10% and about 25% of the available computational resources of a video decoding device, particularly in a mobile device with video playback capability.

Accordingly, it would be desirable to be able to reduce the computational complexity of calculating an inverse integer transform in a video decoding context.

SUMMARY

In accordance with embodiments of the present invention, certain special video decoding cases are identified in which little or no calculation is required to compute an inverse integer transform.

Considering the H.264/AVC standard, three types of inverse integer transforms may need to be performed on residual data—a 4×4 Luma DC transform, a 2×2 Chroma DC transform, and a 4×4 transform for all other types of residual data. The latter transform normally makes up the majority of total transform computations in H.264/AVC coding. The present disclosure provides a way to simplify many of the calculations of that latter type of inverse 4×4 integer transform.

The standard inverse 4×4 residual integer transform according to the H.264/AVC standard includes a horizontal 1D transform operation, followed by a transpose operation, followed by a vertical 1D transform operation, followed by rounding and shifting of the result. However, it has been observed that of the 16 coefficients in the 4×4 matrix to be transformed, only a few are likely to have non-zero values. This leads to the possibility of simplification of the calculations of the transform.

The coefficients are identified by a Variable Length Decoding (VLD) block in a "zigzag order" starting in the upper left of the matrix. The sixteen coefficients are given indices starting with index 0 in the upper left, proceeding right to the second value in the first row which is given index 1, then diagonally down to the first value in the second row which is given the index 2, then down to the first value in the third row, which is given the index 3, then diagonally up to the right until the first row is reached, then right one and back down diagonally to the left, etc., until the last value in the last row, which is given the index 15, is reached.

In accordance with embodiments of the present invention, if the index of the last nonzero coefficient is 0—i.e., there is only one nonzero coefficient (or no nonzero coefficients)—then it is not necessary to take a transform at all, and one can proceed directly to the rounding and shifting step. If the last nonzero coefficient is the second or third in the zigzag order (i.e., index 1 or 2), then a fast integrated 2D transform operation, which combines the two 1D transform operations and the intermediate transpose operation, can be used before proceeding to the rounding and shifting step. Only if the last nonzero coefficient is the fourth (i.e., index 3) or higher coefficient is the transform computed using two 1D transform operations and the intermediate transpose operation, before proceeding to the rounding and shifting step. Thus, in two out of three possible paths, either no calculations need to be performed, or a reduced set of calculations need to be performed.

Therefore, in accordance with embodiments of the present invention, there is provided a method of computing an inverse integer transform from a matrix of coefficients derived by decoding a signal. The method includes determining from the decoding an ordered progression of indexed locations in the matrix, and an index value corresponding to a highest-indexed location in the matrix that contains a predefined (e.g., nonzero) coefficient. When that index value is in a first range of values, above an upper threshold, the inverse integer transform is computed using a first group of operations. When that index value is in a second range of values, between a lower threshold and the upper threshold, the inverse integer transform is computed using a second group of operations, where the second group of operations is less complex than the first group of operations. When the index value is in a third range of values below the lower threshold, the inverse integer transform is computed using a third group of operations, where the third group of operations is less complex than the second group of operations.

Apparatus, particularly video apparatus, that performs the method is also provided.

BRIEF DESCRIPTION OF THE DRAWINGS

The above and other advantages will be apparent upon consideration of the following detailed description, taken in conjunction with the accompanying drawings, in which like reference characters refer to like parts throughout, and in which.

DETAILED DESCRIPTION

Figure 1:
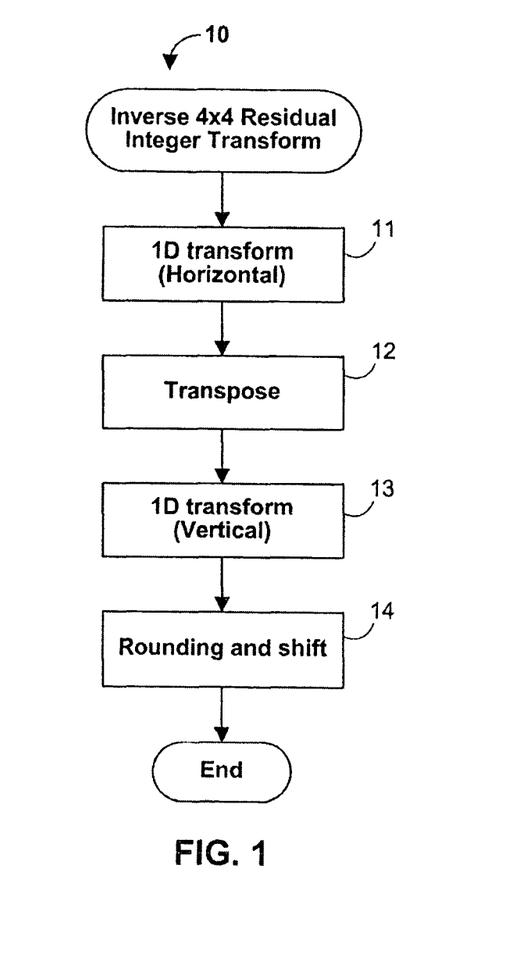
FIG. 1 is a flow diagram of a conventional inverse 4×4 integer transform.
Figure 2:
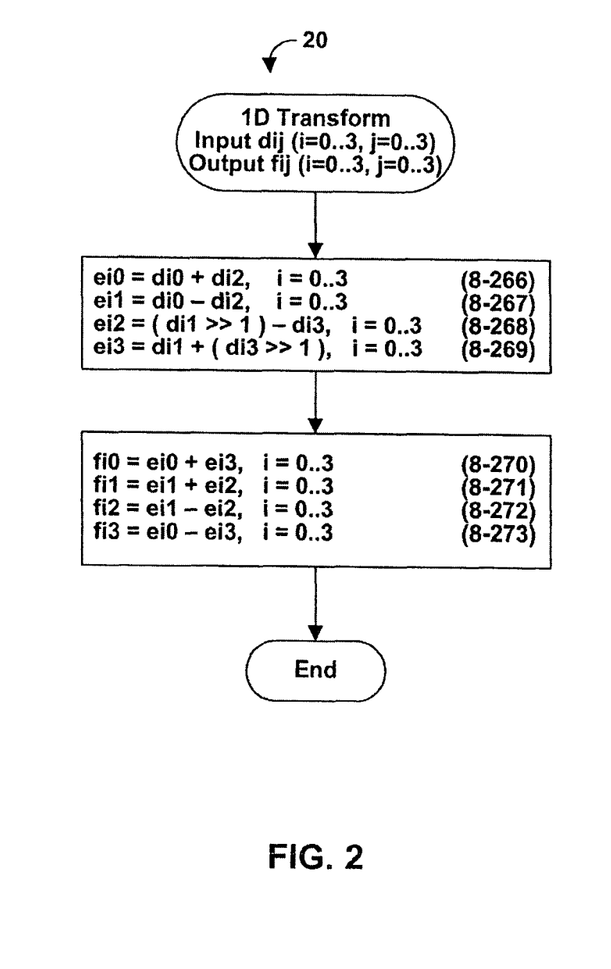
FIG. 2 is a flow diagram showing the requirements of individual 1D transform operations of the transform of FIG. 1.

FIG. 1 shows the computation 10 of a conventional inverse 4×4 integer transform. Computation 10 begins at step 11 where a horizontal 1D transform operation is performed on the 4×4 coefficient matrix. The required calculations 20 for one 1D transform operation are shown in FIG. 2. After the first (horizontal) 1D transform operation 11 is computed, the resultant matrix is transposed at step 12. The transposed matrix is then subjected to a vertical 1D transform operation at step 13, which requires substantially the same calculations 20 as in step 11. Only then is rounding and shifting step 14 performed on the result and computation 10 ends. As seen, the calculations required for this process are substantial.

Figure 3:
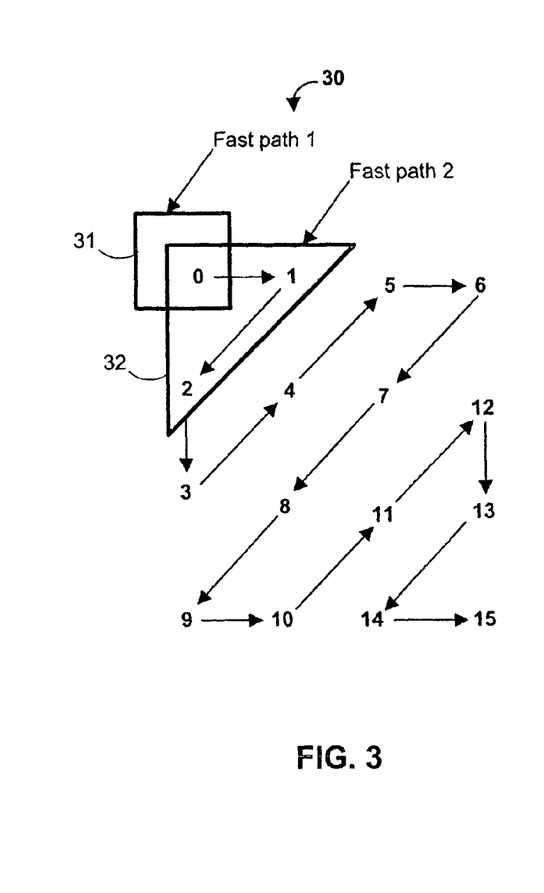
FIG. 3 is a schematic representation of a 4×4 matrix of coefficients according to VLD zigzag order.

The present disclosure relies on data reduction, based on the location of the last nonzero coefficient in the matrix, ordered according to the zigzag order 30 shown in FIG. 3, as derived from the VLD module. Thus, if the first coefficient (index 0) is the highest—i.e., the only—nonzero coefficient (or if all coefficients are zero), then as indicated by square 31, a first data reduction path, referred to below as "Fast Path 1," may be used. If the second or third coefficient (index 1 or 2) is the highest nonzero coefficient, then as indicated by triangle 32, a second data reduction path, referred to below as "Fast Path 2," may be used.

Figure 4:
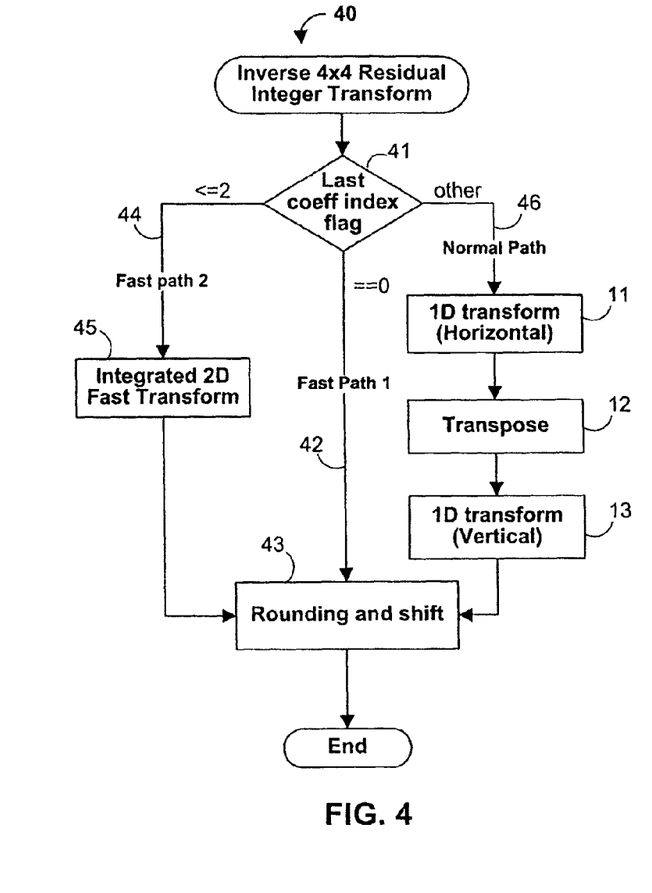
FIG. 4 is a flow diagram of an inverse 4×4 integer transform in accordance with the present invention.

The method 40 according to the invention is shown in FIG. 4. At test 41, it is determined from the VLD data whether the index of the last nonzero coefficient—i.e., the index of the nonzero coefficient of highest index—is 0, nonzero but less than or equal to 2 (i.e., equal to 1 or 2), or another value (i.e., 3 or higher). If at test 41, the index of the last nonzero coefficient is 0, then Fast Path 1, indicated at 42, is chosen, and the method proceeds directly to rounding and shifting step 43.

Figure 5:
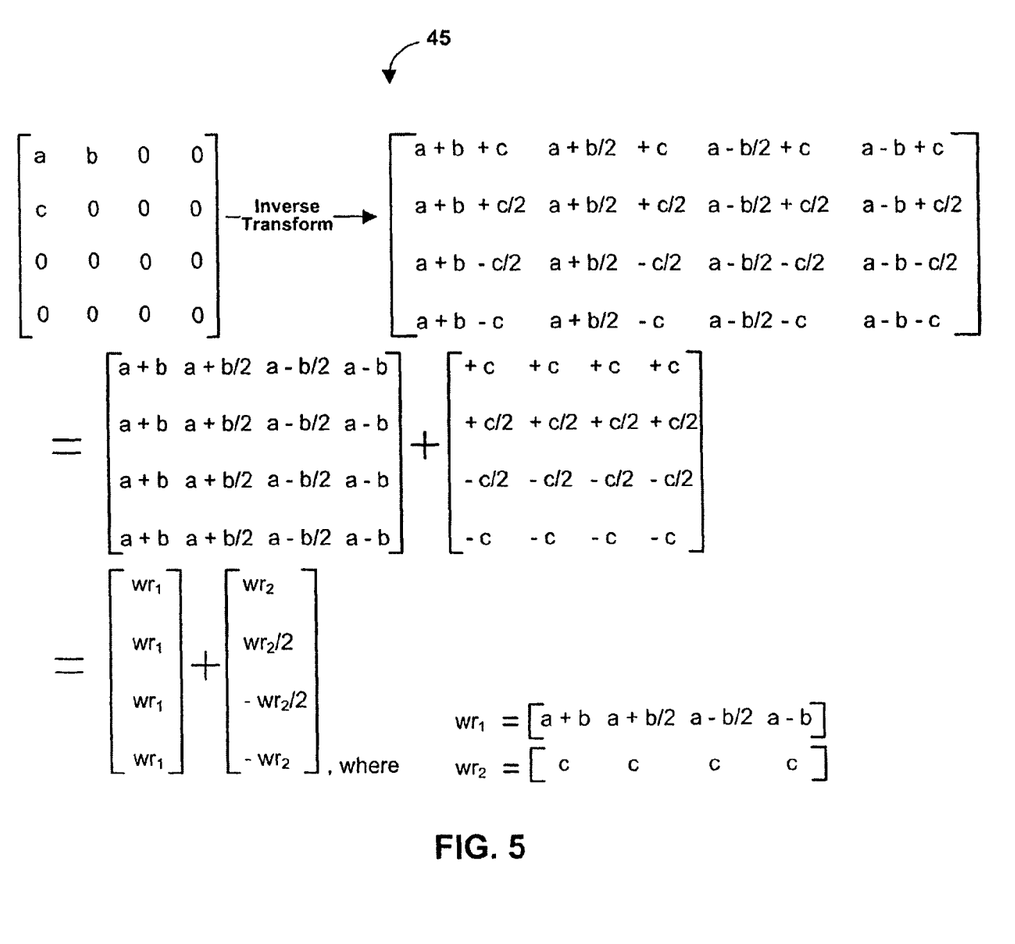
FIG. 5 shows the derivation of an integrated 2D transform operation used in the transform of FIG. 4.

If at test 41, the index of the last nonzero coefficient is 1 or 2, then Fast Path 2, indicated at 44, is chosen, and the method computes an integrated 2D transform operation 45 whose derivation is shown in FIG. 5, before proceeding to rounding and shifting step 43. The computation of integrated 2D transform operation 45, as shown in FIG. 5, uses conventional steps 11-13. However, because many terms drop out when there are at most three nonzero coefficients, transform operation 45 can be reduced to the simpler operation shown at the end of FIG. 5. The conventional steps are shown in FIG. 5 only to show the derivation of the simpler operation, and it is the simpler operation that is used directly in Fast Path 2.

However, with four or more nonzero coefficients, the conventional 1D transform-transpose-1D transform approach cannot be avoided. Therefore, if at test 41, the index of the last nonzero coefficient is 3 or higher, then normal path 46 is chosen, and the method computes the transform conventionally.

Because of the nature of video coding motion compensation, it is likely that a 4×4 video block to be transformed will have very few nonzero coefficients. The table below shows empirical observations for video streams decoded in accordance with embodiments of the invention:

| Data Rate (Mbps) | Percentage of Transforms Requiring Fast Path 1 (approx.) | Percentage of Transforms Requiring Fast Path 2 (approx.) | Percentage of Transforms Requiring Normal Path (approx.) | Savings (MIPS/ % of MIPS) |
|---|---|---|---|---|
| 1.5 | 26.82 | 29.87 | 43.31 | 9.82/43.58 |
| 3.0 | 20.86 | 31.98 | 47.16 | 13.61/39.24 |
| 5.7 | 10.03 | 32.51 | 57.43 | 25.82/29.36 |
| 9.3 | 4.69 | 30.07 | 65.24 | 25.87/22.81 |

Thus it is seen that a method, and corresponding apparatus, for calculating inverse integer transforms in video processing using fewer computations, by using simplified techniques in certain situations, is provided.

Referring now to FIGS. 6-9, exemplary implementations of the present invention are shown.

Figure 6:
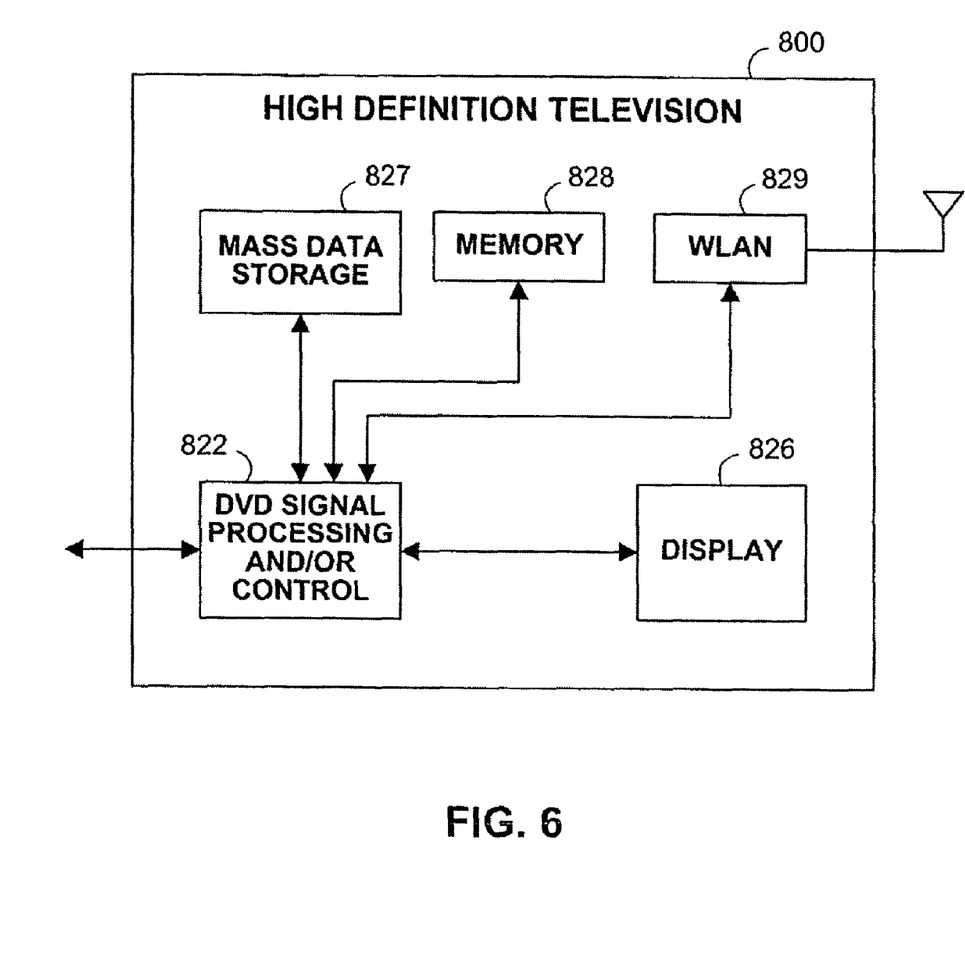
FIG. 6 is a block diagram of an exemplary high definition television that can employ the disclosed technology.

Referring now to FIG. 6 the present invention can be implemented in a high definition television (HDTV) 800. The present invention may be implemented in either or both of signal processing and/or control circuits, which are generally identified in FIG. 9 at 822, and which, in accordance with embodiments of the present invention, include variable length decoding circuitry. The HDTV 800 receives HDTV input signals in either a wired or wireless format and generates HDTV output signals for a display 826. In some implementations, signal processing circuit and/or control circuit 822 and/or other circuits (not shown) of the HDTV 820 may process data, perform coding and/or encryption, perform calculations, format data and/or perform any other type of HDTV processing that may be required.

The HDTV 800 may communicate with mass data storage 827 that stores data in a nonvolatile manner such as optical and/or magnetic storage devices. At least one hard disk drive (HDD) may be provided. The HDD may be a mini-HDD that includes one or more platters having a diameter that is smaller than approximately 1.8". The HDTV 800 may be connected to memory 1028 such as RAM, ROM, low-latency nonvolatile memory such as flash memory, and/or other suitable electronic data storage. The HDTV 800 also may support connections with a WLAN via a WLAN network interface 829.

Figure 7:
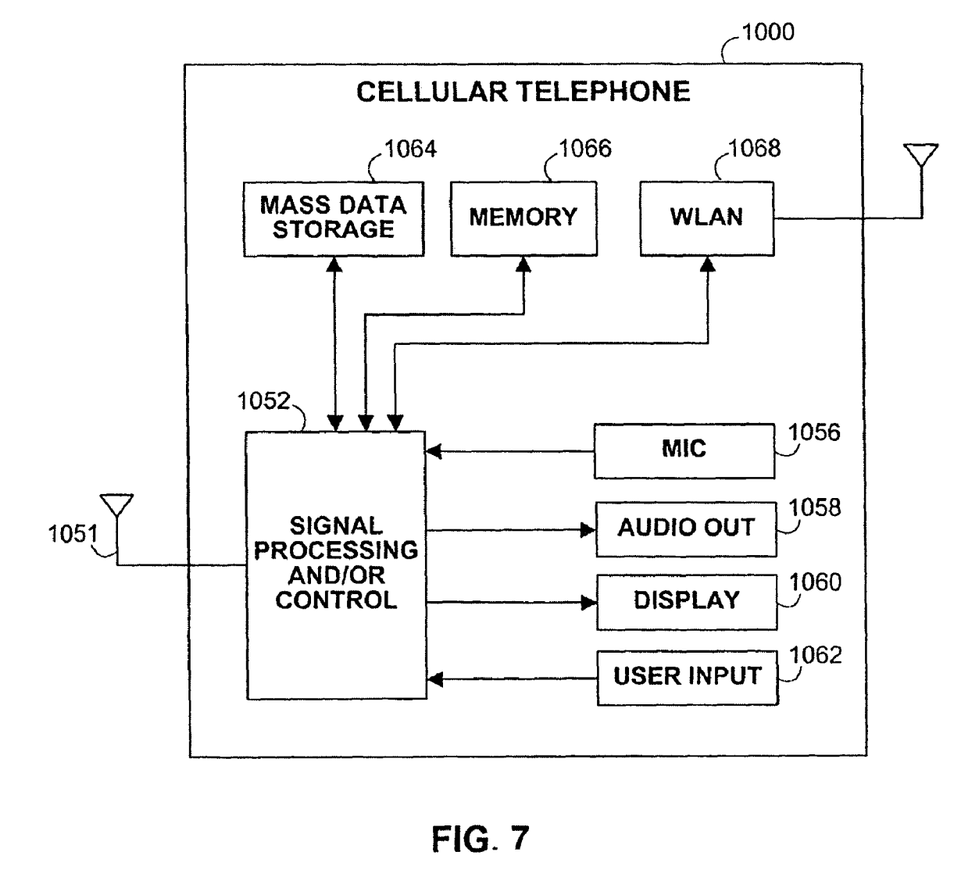
FIG. 7 is a block diagram of an exemplary cellular telephone that can employ the disclosed technology.

Referring now to FIG. 7, the present invention can be implemented in a video-capable cellular telephone 1000 that may include a cellular antenna 1051. The present invention may be implemented in either or both of signal processing and/or control circuits, which are generally identified in FIG. 11 at 1052, and which, in accordance with embodiments of the present invention, include variable length decoding circuitry. In some implementations, the cellular telephone 1000 includes a microphone 1056, an audio output 1058 such as a speaker and/or audio output jack, a display 1060 and/or an input device 1062 such as a keypad, pointing device, voice actuation and/or other input device. The signal processing and/or control circuits 1052 and/or other circuits (not shown) in the cellular telephone 1000 may process data, perform coding and/or encryption, perform calculations, format data and/or perform other cellular telephone functions.

The cellular telephone 1000 may communicate with mass data storage 1064 that stores data in a nonvolatile manner such as optical and/or magnetic storage devices—for example hard disk drives (HDDs) and/or DVDs. The HDD may be a mini-HDD that includes one or more platters having a diameter that is smaller than approximately 1.8". The cellular telephone 1000 may be connected to memory 1066 such as RAM, ROM, low-latency nonvolatile memory such as flash memory, and/or other suitable electronic data storage. The cellular telephone 1000 also may support connections with a WLAN via a WLAN network interface 1068.

Figure 8:
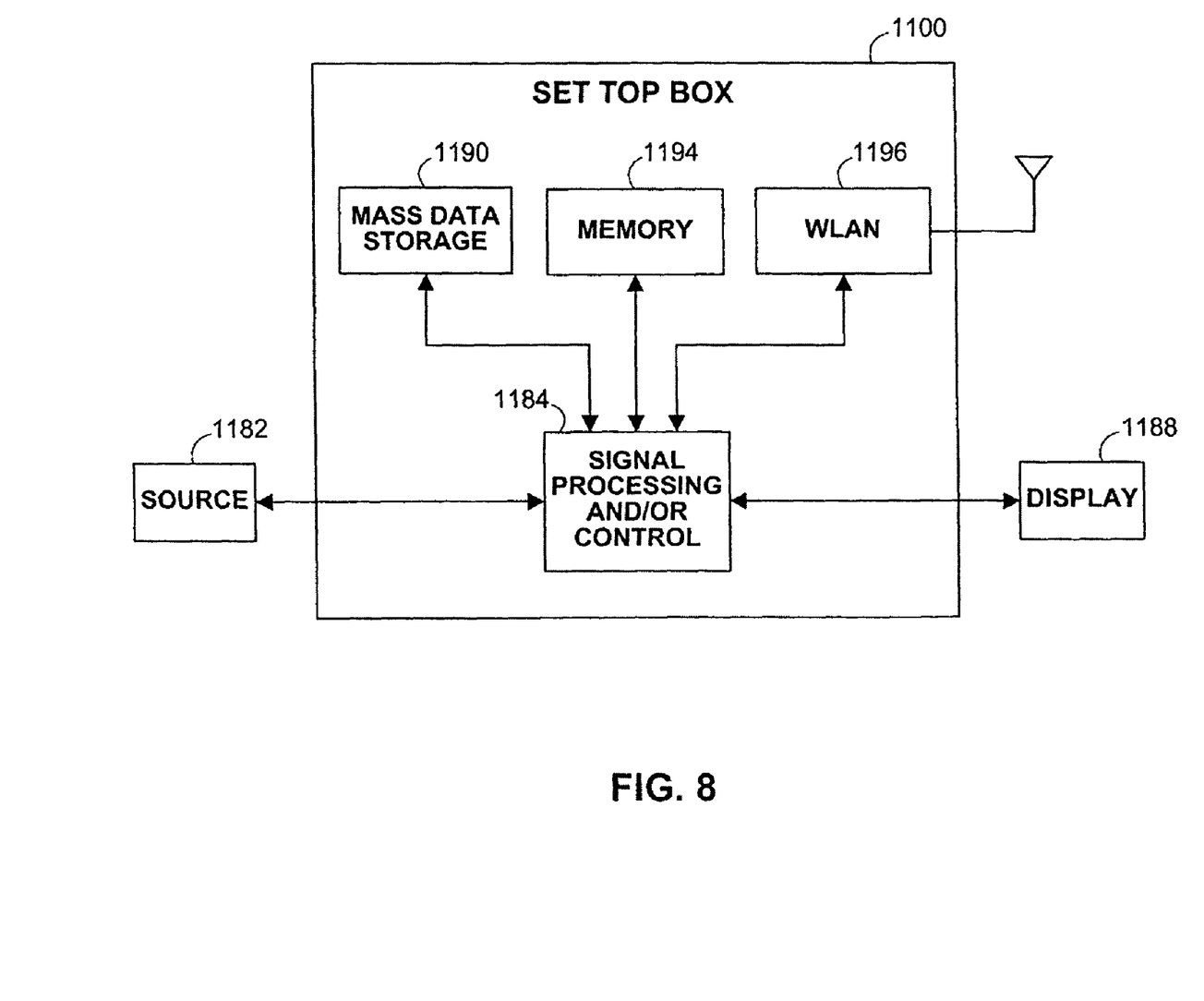
FIG. 8 is a block diagram of an exemplary set-top box that can employ the disclosed technology.

Referring now to FIG. 8, the present invention can be implemented in a set top box 1100. The present invention may be implemented in either or both of signal processing and/or control circuits, which are generally identified in FIG. 8 at 1184, and which, in accordance with embodiments of the present invention, include variable length decoding circuitry. Set top box 1100 receives signals from a source 1182 such as a broadband source and outputs standard and/or high definition audio/video signals suitable for a display 1188 such as a television and/or monitor and/or other video and/or audio output devices. The signal processing and/or control circuits 1184 and/or other circuits (not shown) of the set top box 1100 may process data, perform coding and/or encryption, perform calculations, format data and/or perform any other set top box function.

Set top box 1100 may communicate with mass data storage 1190 that stores data in a nonvolatile manner. The mass data storage 1190 may include optical and/or magnetic storage devices for example hard disk drives HDD and/or DVDs. The HDD may be a mini-HDD that includes one or more platters having a diameter that is smaller than approximately 1.8". Set top box 1100 may be connected to memory 1194 such as RAM, ROM, low-latency nonvolatile memory such as flash memory, and/or other suitable electronic data storage. Set top box 1100 also may support connections with a WLAN via a WLAN network interface 1196.

Figure 9:
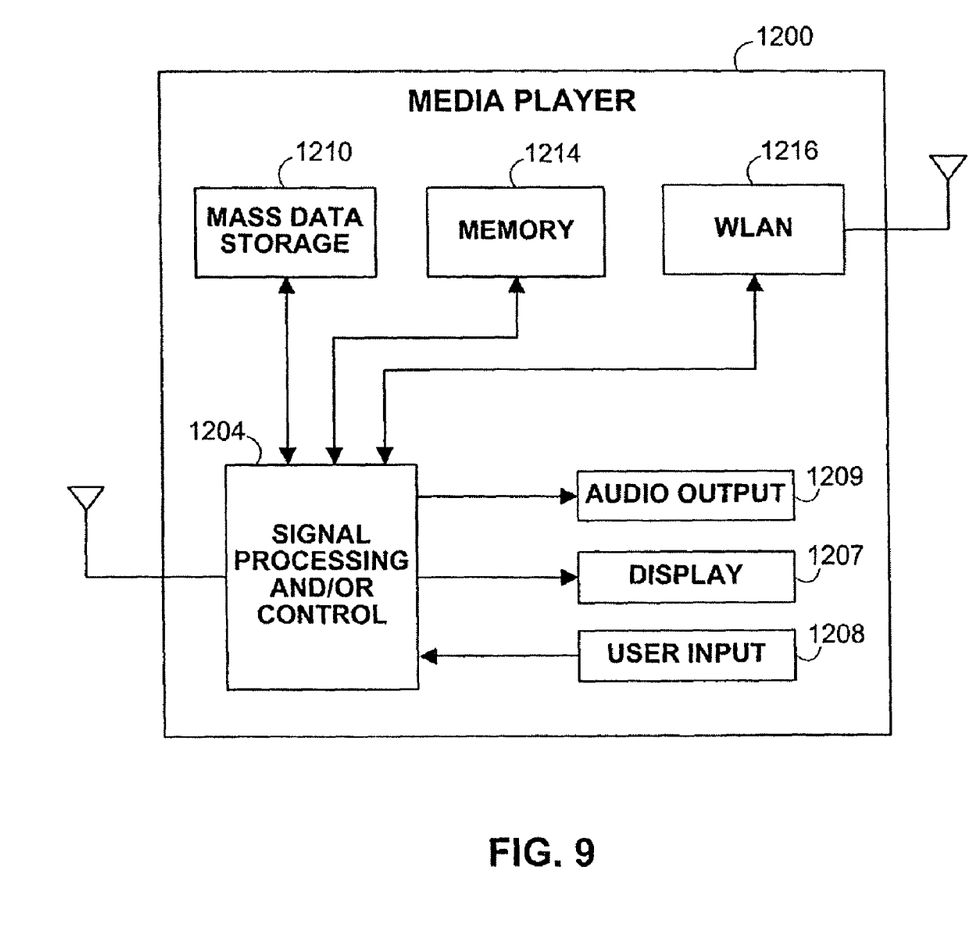
FIG. 9 is a block diagram of an exemplary media player that can employ the disclosed technology.

Referring now to FIG. 9, the present invention can be implemented in a media player 1200. The present invention may be implemented in either or both of signal processing and/or control circuits, which are generally identified in FIG. 9 at 1204, and which, in accordance with embodiments of the present invention, include variable length decoding circuitry. In some implementations, the media player 1200 includes a display 1207 and/or a user input 1208 such as a keypad, touchpad and the like. In some implementations, the media player 1200 may employ a graphical user interface (GUI) that typically employs menus, drop down menus, icons and/or a point-and-click interface via the display 1207 and/or user input 1208. Media player 1200 further includes an audio output 1209 such as a speaker and/or audio output jack. The signal processing and/or control circuits 1204 and/or other circuits (not shown) of media player 1200 may process data, perform coding and/or encryption, perform calculations, format data and/or perform any other media player function.

Media player 1200 may communicate with mass data storage 1210 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini-HDD that includes one or more platters having a diameter that is smaller than approximately 1.8". Media player 1200 may be connected to memory 1214 such as RAM, ROM, low-latency nonvolatile memory such as flash memory, and/or other suitable electronic data storage. Media player 1200 also may support connections with a WLAN via a WLAN network interface 1216. Still other implementations in addition to those described above are contemplated.

Although the invention is most advantageous for mobile video platforms such as cellular telephone 1000 or media player 1200, it is still advantageous even in video processing platforms where power and computing resources are less constrained, such as HDTV 800 or set-top box 1100.

It will be understood that the foregoing is only illustrative of the principles of the invention, and that the invention can be practiced by other than the described embodiments, which are presented for purposes of illustration and not of limitation.

What is claimed is:

1. A method of computing an inverse integer transform from a matrix of coefficients derived by decoding a signal, said method comprising:

determining from said decoding an ordered progression of indexed locations in said matrix, and an index value corresponding to a highest-indexed location in said matrix that contains a predefined coefficient;

when said index value is in a first range of values, above an upper threshold, computing said inverse integer transform using a first group of operations;

when said index value is in a second range of values, between a lower threshold and said upper threshold, computing said inverse integer transform using a second group of operations, said second group of operations being less complex than said first group of operations; and when said index value is in a third range of values below said lower threshold, computing said inverse integer transform using a third group of operations, said third group of operations being less complex than said second group of operations.

2. The method of claim 1 wherein said predefined coefficient is a nonzero coefficient.

3. The method of claim 1 wherein said decoding is variable length decoding.

4. The method of claim 1 wherein said signal is a video signal.

5. The method of claim 1 wherein:
said matrix is a 4×4 matrix;
said first range of values indicates that said highest-indexed location in said matrix that contains a predefined coefficient is a location at or beyond a fourth position in said ordered progression of locations in said matrix.

6. The method of claim 5 wherein said first group of operations comprises a horizontal 1D transform operation, followed by a transpose operation, followed by a vertical 1D transform operation, followed by a rounding and shifting operation.

7. The method of claim 5 wherein said second range of values indicates that said highest-indexed location in said matrix that contains a predefined coefficient is one of a second position and a third position in said ordered progression of locations in said matrix.

8. The method of claim 7 wherein said second group of operations comprises an integrated 2D transform operation followed by a rounding and shifting operation.

9. The method of claim 8 wherein said integrated 2D transform operation is derived from a horizontal 1D transform operation, followed by a transpose operation, followed by a vertical 1D transform operation, where values in all locations at and beyond said fourth position in said ordered progression of locations in said matrix are equal to zero.

10. The method of claim 7 wherein said third range of values indicates that said highest-indexed location in said matrix that contains a predefined coefficient is a first position in said ordered progression of locations in said matrix.

11. The method of claim 10 wherein said third group of operations consists of a rounding and shifting operation.

12. The method of claim 1 wherein said ordered progression of indexed locations in said matrix follows a zigzag pattern through said matrix.

13. Apparatus for computing an inverse integer transform from a matrix of coefficients derived by decoding a signal, said apparatus comprising:

a decoder that determines said matrix of coefficients, an ordered progression of indexed locations in said matrix, and an index value corresponding to a highest-indexed location in said matrix that contains a predefined coefficient; and control circuitry that:

when said index value is in a first range of values, above an upper threshold, computes said inverse integer transform using a first group of operations;

when said index value is in a second range of values, between a lower threshold and said upper threshold, computes said inverse integer transform using a second group of operations, said second group of operations being less complex than said first group of operations; and when said index value is in a third range of values below said lower threshold, computes said inverse integer transform using a third group of operations, said third group of operations being less complex than said second group of operations.

14. The apparatus of claim 13 wherein said predefined coefficient is a nonzero coefficient.

15. The apparatus of claim 13 wherein:
said decoding is variable length decoding; and
said decoder is a variable length decoder.

16. The apparatus of claim 13 wherein said signal is a video signal.

17. The apparatus of claim 13 wherein:
said matrix is a 4×4 matrix;
said first range of values indicates that said highest-indexed location in said matrix that contains a predefined coefficient is a location at or beyond a fourth position in said ordered progression of locations in said matrix.

18. The apparatus of claim 17 wherein said first group of operations comprises a horizontal 1D transform operation, followed by a transpose operation, followed by a vertical 1D transform operation, followed by a rounding and shifting operation.

19. The apparatus of claim 18 wherein said second range of values indicates that said highest-indexed location in said matrix that contains a predefined coefficient is one of a second position and a third position in said ordered progression of locations in said matrix.

20. The apparatus of claim 19 wherein said second group of operations comprises an integrated 2D transform operation followed by a rounding and shifting operation.

21. The apparatus of claim 20 wherein said integrated 2D transform operation is derived from a horizontal 1D transform operation, followed by a transpose operation, followed by a vertical 1D transform operation, where values in all locations at and beyond said fourth position in said ordered progression of locations in said matrix are equal to zero.

22. The apparatus of claim 19 wherein said third range of values indicates that said highest-indexed location in said matrix that contains a predefined coefficient is a first position in said ordered progression of locations in said matrix.

23. The apparatus of claim 22 wherein said third group of operations consists of a rounding and shifting operation.

24. The apparatus of claim 13 wherein said ordered progression of indexed locations in said matrix follows a zigzag pattern through said matrix.

25. Video apparatus comprising:
a display; and
driver circuitry that drives said display, said driver circuitry computing an inverse integer transform from a matrix of coefficients derived by decoding of a video signal, said driver circuitry comprising:
a decoder that determines said matrix of coefficients, an ordered progression of indexed locations in said matrix, and an index value corresponding to a highest-indexed location in said matrix that contains a predefined coefficient; and control circuitry that:
when said index value is in a first range of values, above an upper threshold, computes said inverse integer transform using a first group of operations;
when said index value is in a second range of values, between a lower threshold and said upper threshold, computes said inverse integer transform using a second group of operations, said second group of operations being less complex than said first group of operations; and
when said index value is in a third range of values below said lower threshold, computes said inverse integer transform using a third group of operations, said third group of operations being less complex than said second group of operations.

26. The video apparatus of claim 25 wherein said predefined coefficient is a nonzero coefficient.

27. The video apparatus of claim 25 wherein:
said decoding is variable length decoding; and
said decoder is a variable length decoder.

28. The apparatus of claim 25 wherein:
said matrix is a 4×4 matrix;
said first range of values indicates that said highest-indexed location in said matrix that contains a predefined coefficient is a location at or beyond a fourth position in said ordered progression of locations in said matrix.

29. The apparatus of claim 28 wherein said first group of operations comprises a horizontal 1D transform operation, followed by a transpose operation, followed by a vertical 1D transform operation, followed by a rounding and shifting operation.

30. The apparatus of claim 28 wherein said second range of values indicates that said highest-indexed location in said matrix that contains a predefined coefficient is one of a second position and a third position in said ordered progression of locations in said matrix.

31. The apparatus of claim 30 wherein said second group of operations comprises an integrated 2D transform operation followed by a rounding and shifting operation.

32. The apparatus of claim 31 wherein said integrated 2D transform operation is derived from a horizontal 1D transform operation, followed by a transpose operation, followed by a vertical 1D transform operation, where values in all locations at and beyond said fourth position in said ordered progression of locations in said matrix are equal to zero.

33. The apparatus of claim 30 wherein said third range of values indicates that said highest-indexed location in said matrix that contains a predefined coefficient is a first position in said ordered progression of locations in said matrix.

34. The apparatus of claim 33 wherein said third group of operations consists of a rounding and shifting operation.

35. The apparatus of claim 25 wherein said ordered progression of indexed locations in said matrix follows a zigzag pattern through said matrix.

* * * * *